(12) United States Patent
Masubuchi et al.

(10) Patent No.: US 12,349,687 B2
(45) Date of Patent: Jul. 8, 2025

(54) POULTRY LEG MEAT SLIT-FORMING DEVICE AND POULTRY LEG MEAT AUTOMATIC SLIT-FORMING METHOD

(71) Applicant: MAYEKAWA MFG. CO., LTD., Tokyo (JP)

(72) Inventors: Ken Masubuchi, Tokyo (JP); Shinya Nakamura, Tokyo (JP); Kenichi Oka, Tokyo (JP); Kenichiro Sakurai, Tokyo (JP); Noriyuki Inoue, Tokyo (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 0 days.

(21) Appl. No.: 18/287,831

(22) PCT Filed: Dec. 16, 2022

(86) PCT No.: PCT/JP2022/046401
§ 371 (c)(1),
(2) Date: Oct. 20, 2023

(87) PCT Pub. No.: WO2023/120417
PCT Pub. Date: Jun. 29, 2023

(65) Prior Publication Data
US 2024/0180176 A1    Jun. 6, 2024

(30) Foreign Application Priority Data

Dec. 20, 2021    (JP) ................. 2021-206462

(51) Int. Cl.
*A22C 17/00*    (2006.01)
*A22C 17/02*    (2006.01)
(Continued)

(52) U.S. Cl.
CPC .............. *A22C 17/02* (2013.01); *A22C 17/06* (2013.01); *A22C 21/0053* (2013.01)

(58) Field of Classification Search
CPC .. A22C 17/02; A22C 21/0023; A22C 21/0076
(Continued)

(56) References Cited

U.S. PATENT DOCUMENTS 5,228,881 A * 7/1993 Sekiguchi ............... A22C 17/04
452/136
5,401,210 A * 3/1995 Manmoto .......... A22C 21/0076
452/136
(Continued)

FOREIGN PATENT DOCUMENTS

EP    2153727 A1    2/2010
JP    S60-089882 U    6/1985
(Continued)

OTHER PUBLICATIONS

International Search Report in corresponding International Application No. PCT/JP2022/046401, ddated Feb. 14, 2023 (4 pages).
(Continued)

*Primary Examiner* — Richard T Price, Jr.
(74) *Attorney, Agent, or Firm* — Osha Bergman Watanabe & Burton LLP

(57) ABSTRACT

A poultry leg meat slit-forming device includes: an ankle holding part configured to hold an ankle of bone-in poultry leg meat cut from a femur of a poultry carcass; a blade unit having a slit-forming blade; an inserting driving part configured to drive the blade unit such that an blade tip of the slit-forming blade is inserted into the poultry leg meat along an opposite side with respect to a kneecap in a tibia among the poultry leg meat held on the ankle holding part; and a leg meat pressing part configured to elastically press a surface of the poultry leg meat from a side of the kneecap.

10 Claims, 4 Drawing Sheets

(51) Int. Cl.
*A22C 17/06* (2006.01)
*A22C 21/00* (2006.01)

(58) Field of Classification Search
USPC .......................................................... 452/135
See application file for complete search history.

(56) References Cited

U.S. PATENT DOCUMENTS

| | | | | |
|---|---|---|---|---|
| 5,976,004 | A | * | 11/1999 | Hazenbroek ....... A22C 21/0076 |
| | | | | 452/136 |
| 2014/0120815 | A1 | * | 5/2014 | Stooker .............. A22C 21/0076 |
| | | | | 452/125 |
| 2021/0084913 | A1 | | 3/2021 | Kido et al. |
| 2022/0312781 | A1 | | 10/2022 | Kido et al. |

FOREIGN PATENT DOCUMENTS

| | | |
|---|---|---|
| JP | 4073133 B2 | 4/2008 |
| TW | I680719 B | 1/2020 |
| WO | 2008-136513 A1 | 11/2008 |
| WO | 2019-131362 A1 | 7/2019 |
| WO | 2021-230072 A1 | 11/2021 |

OTHER PUBLICATIONS

Office Action in corresponding Taiwanese Patent Application No. 111148370, dated Aug. 9, 2023 (9 pages).

\* cited by examiner

POULTRY LEG MEAT SLIT-FORMING DEVICE AND POULTRY LEG MEAT AUTOMATIC SLIT-FORMING METHOD

TECHNICAL FIELD

The present invention relates to a poultry leg meat slit-forming device and a poultry leg meat automatic slit-forming method.

Priority is claimed on Japanese Patent Application No. 2021-206462, filed Dec. 20, 2021, the content of which is incorporated herein by reference.

BACKGROUND ART

In the related art, a device (an automatic deboning device) configured to automatically debone bone-in poultry leg meat (hereinafter, simply referred to as poultry leg meat) cut from a femur of a poultry carcass is known. This is a device for a process previous to a final process of peeling off meat part from a bone, and includes a holding mechanism configured to hang poultry leg meat and a slit-forming mechanism configured to perform slit-forming on the poultry leg meat hung on an ankle holding part thereof.

The holding mechanism includes the ankle holding part (hanger) configured to hold an ankle of poultry leg meat and hang the poultry leg meat, an upper pusher configured to press the Achilles tendon side of the poultry leg meat, and a lower pusher configured to press a lower portion of the poultry leg meat. The slit-forming mechanism includes a slit-forming blade, an advancing/retreating part configured to insert the slit-forming blade into the poultry leg meat, and an elevating part configured to move the slit-forming blade inserted into the poultry leg meat down.

Under this configuration, the automatic deboning device performs slit-forming on the poultry leg meat as the process previous to the final process of peeling the meat part off the bone. Specifically, the slit-forming blade is inserted along the bone in the vicinity of the ankle of the poultry leg meat. The upper pusher is decompressed when the slit-forming blade is moved down in the femoral region. For slit-forming by the slit-forming blade at the knee joint, the pressing of the upper and lower pushers is released to prevent dislocation of the knee joint part and move the slit-forming blade down. When moving the slit-forming blade down in the femoral region, the lower pusher is pressed to push the femur diagonally upward, and then depressurized to appropriately change pressurization of the bone part against a blade edge surface which is lowered along the femur lower than the knee joint and move the bone part down. A yield percentage when the poultry leg meat is automatically deboned is improved by performing such slit-forming on the poultry leg meat.

CITATION LIST

Patent Document

Japanese Patent No. 4073133

SUMMARY OF INVENTION

Technical Problem

Poultry carcasses have different thicknesses of bones depending on chicken species, day-old, and rearing methods of farms. For this reason, the optimal inserting position of the slit-forming blade with respect to the bone changes according to each piece of poultry leg meat. As a result, there is a case in which the slit-forming blade damage the bone or slit-forming cannot be performed along the bone. Accordingly, in the final process of peeling the meat part off the bone, there have been problems such as bone pieces remaining in the deboned poultry leg meat and difficulty in improving the yield percentage of the deboned poultry leg meat.

Here, the present invention provides a poultry leg meat slit-forming device and a poultry leg meat automatic slit-forming method that are capable of suppressing bone pieces from remaining in the deboned poultry leg meat and improving the yield percentage of the deboned poultry leg meat.

Solution to Problem

In order to achieve the aforementioned objects, a poultry leg meat slit-forming device according to the present invention includes an ankle holding part configured to hold an ankle of bone-in poultry leg meat cut from a femur of a poultry carcass; a blade unit having a slit-forming blade; a inserting driving part configured to drive the blade unit such that an blade tip of the slit-forming blade is inserted into the poultry leg meat along an opposite side with respect to a kneecap in a tibia among the poultry leg meat held on the ankle holding part; a leg meat pressing part configured to elastically press a surface of the poultry leg meat from a side of the kneecap; and a moving part configured to move at least one of the ankle holding part and the blade unit with respect to the other one such that the slit-forming blade makes a slit-forming movement in an extending direction of the poultry leg meat held by the ankle holding part, the blade unit including a blade holding part configured to hold the slit-forming blade such that a blade edge of the slit-forming blade faces a side opposite with respect to the ankle holding part in a direction of the slit-forming movement of the slit-forming blade and that is configured to hold the slit-forming blade so as to be displaceable in a front surface/back surface direction of the slit-forming blade; and a biasing part configured to elastically bias the slit-forming blade toward a bone of the poultry leg meat in the front surface/back surface direction of the slit-forming blade.

According to the above-mentioned configuration, when the blade tip of the slit-forming blade is inserted along a side portion of the tibia by the inserting driving part, the slit-forming blade is displaced to escape in the front surface/back surface direction when the slit-forming blade hits the bone. Here, the slit-forming blade is elastically biased toward the bone by the biasing part. The slit-forming blade escapes against this elastic force. For this reason, it is possible to prevent the slit-forming blade from sticking into the bone. The slit-forming blade is pressed along the bone. For this reason, the slit-forming blade can be reliably aligned with the bone. When the slit-forming blade hits the bone, the slit-forming blade escapes from the bone. For this reason, the slit-forming blade can be inserted while aiming a part of meat which is closest to a side portion of the bone as much as possible. The leg meat pressing part prevents the bone and the slit-forming blade from being displaced toward each other. The slit-forming blade can be moved to perform the slit-forming while being brought in close contact with the bone. Accordingly, in a final process of peeling the meat part off the bone later, remaining bone pieces in the deboned poultry leg meat can be suppressed. A yield percentage of the deboned poultry leg meat can be improved.

In the above-mentioned configuration, the ankle holding part may hang the poultry leg meat, and the moving part may vertically move at least one of the ankle holding part and the blade unit such that the slit-forming blade makes the slit-forming movement downward with respect to the poultry leg meat.

According to the above-mentioned configuration, a posture of the poultry leg meat can be easily controlled using gravity. The slit-forming blade can easily cut the meat along the bone.

In the above-mentioned configuration, the leg meat pressing part may have a pressing force adjusting part configured to change a posture of the bone of the poultry leg meat such that the slit-forming blade move along with the bone of the poultry leg meat by changing a pressing force against the poultry leg meat according to a relative movement amount between the ankle holding part and the blade unit by the moving part.

A joint (in the vicinity of the kneecap) where the femur and the tibia of the poultry leg meat are connected is bent. For this reason, if the slit-forming blade is simply moved in a straight line to cut the meat along the bone from the tibia to the femur, there is a possibility that the slit-forming blade will cut into the cartilage part of the joint. Therefore, the pressing force of the leg meat pressing part is changed by the pressing force adjusting part. Accordingly, when the slit-forming blade tries to cut into the cartilage part of the joint, the posture is changed so that the poultry leg meat escapes from the slit-forming blade against the pressing force of the pressing force adjusting part. For this reason, the slit-forming blade can be reliably moved along with the bones from the tibia to the femur without damaging these bones. Accordingly, remaining bone pieces in the deboned poultry leg meat can be more reliably suppressed. The yield percentage of the deboned poultry leg meat can be more reliably improved.

In the above-mentioned configuration, the blade holding part may hold the slit-forming blade such that the slit-forming blade is swung about a rear of a blade base of the slit-forming blade and a blade tip side of the slit-forming blade is displaced in the front surface/back surface direction more greatly than the blade base side of the slit-forming blade.

According to the above-mentioned configuration, the slit-forming blade can easily escape from the bone when the blade tip of the slit-forming blade hits the bone.

In the above-mentioned configuration, the blade holding part may include a regulating part configured to regulate a displacement range of the slit-forming blade.

If the displacement range of the slit-forming blade is unnecessarily widened, it will be difficult to determine the position of the blade tip of the slit-forming blade. It becomes difficult for the slit-forming blade to be inserted into the meat while aiming the side portion of the bone. For this reason, the regulating part regulates the displacement range of the slit-forming blade. Accordingly, the blade tip of the slit-forming blade can be easily inserted while aiming a part of the meat which is closest to the side portion of the bone. Accordingly, the yield percentage of the deboned poultry leg meat can be further improved.

In the above-mentioned configuration, a chopping board section configured to hold escape of the slit-forming blade in an inserting direction in the poultry leg meat may be provided.

According to the above-mentioned configuration, the slit-forming blade can be reliably inserted into the poultry leg meat.

A poultry leg meat automatic slit-forming method according to the present invention includes an ankle holding process of holding an ankle of bone-in poultry leg meat cut from a femur of a poultry carcass; a blade inserting process of inserting a blade tip of a slit-forming blade into the poultry leg meat along an opposite side with respect to a kneecap in a tibia among the poultry leg meat and so that the blade tip of the slit-forming blade does not pass through the poultry leg meat at a vicinity of the ankle of the poultry leg meat; a pressing process of elastically pressing a surface of the poultry leg meat from a side of the kneecap after the blade inserting process; and a slit-forming process of performing a slit-forming along a bone of the poultry leg meat by making the slit-forming blade to perform a slit-forming movement in a straight line until a femur head of the poultry leg meat in a state in which the pressing process is continued, wherein, in the blade inserting process and the slit-forming process, the slit-forming blade is elastically biased such that a flat portion of the slit-forming blade faces toward the bone.

According to the above-mentioned method, the blade tip of the slit-forming blade can be inserted while aiming a part of the meat which is closest to the side portion of the bone in the poultry leg meat. Even if the slit-forming blade hits the bone, the slit-forming blade can reliably escape from the bone. For this reason, in the final process of peeling the meat part off the bone later, remaining bone pieces in the deboned poultry leg meat can be suppressed. The yield percentage of the deboned poultry leg meat can be improved.

In the above-mentioned method, in the pressing process, when a movement amount of the slit-forming blade exceeds a predetermined amount during the slit-forming process, a pressing force against the poultry leg meat may be reduced.

According to the above-mentioned method, a slit-forming movement of the slit-forming blade can be made along the tibia and femur that are bent and connected. That is, by reducing the pressing force of the leg meat pressing part using the pressing force adjusting part, the poultry leg meat can escape before the slit-forming blade cuts into the cartilage part of the joint. Accordingly, the slit-forming blade can be reliably aligned with the bones from the tibia to the femur without damaging these bones. Accordingly, remaining bone pieces in the deboned poultry leg meat can be more reliably suppressed, and the yield percentage of the deboned poultry leg meat can be more reliably improved.

In the above-mentioned method, in the ankle holding process, the poultry leg meat may be hung, and in the slit-forming process, the slit-forming blade may be vertically lowered.

According to the above-mentioned method, the posture of the poultry leg meat can be easily controlled using gravity. The slit-forming blade can easily cut the meat along the bone.

In the above-mentioned method, in the blade inserting process, the pressing process, and the slit-forming process, an escape holding process of holding escape of the slit-forming blade in an inserting direction in the poultry leg meat may be provided.

According to the above-mentioned method, the slit-forming blade can be reliably inserted into the poultry leg meat.

Advantageous Effects of Invention

According to the present invention, it is possible to suppress bone pieces from remaining in the deboned poultry leg meat in the final process of peeling the meat part off the bone. It is possible to improve the yield percentage of the deboned poultry leg meat.

DESCRIPTION OF EMBODIMENTS

Hereinafter, an embodiment of the present invention will be described with reference to the accompanying drawings.

Figure 1:
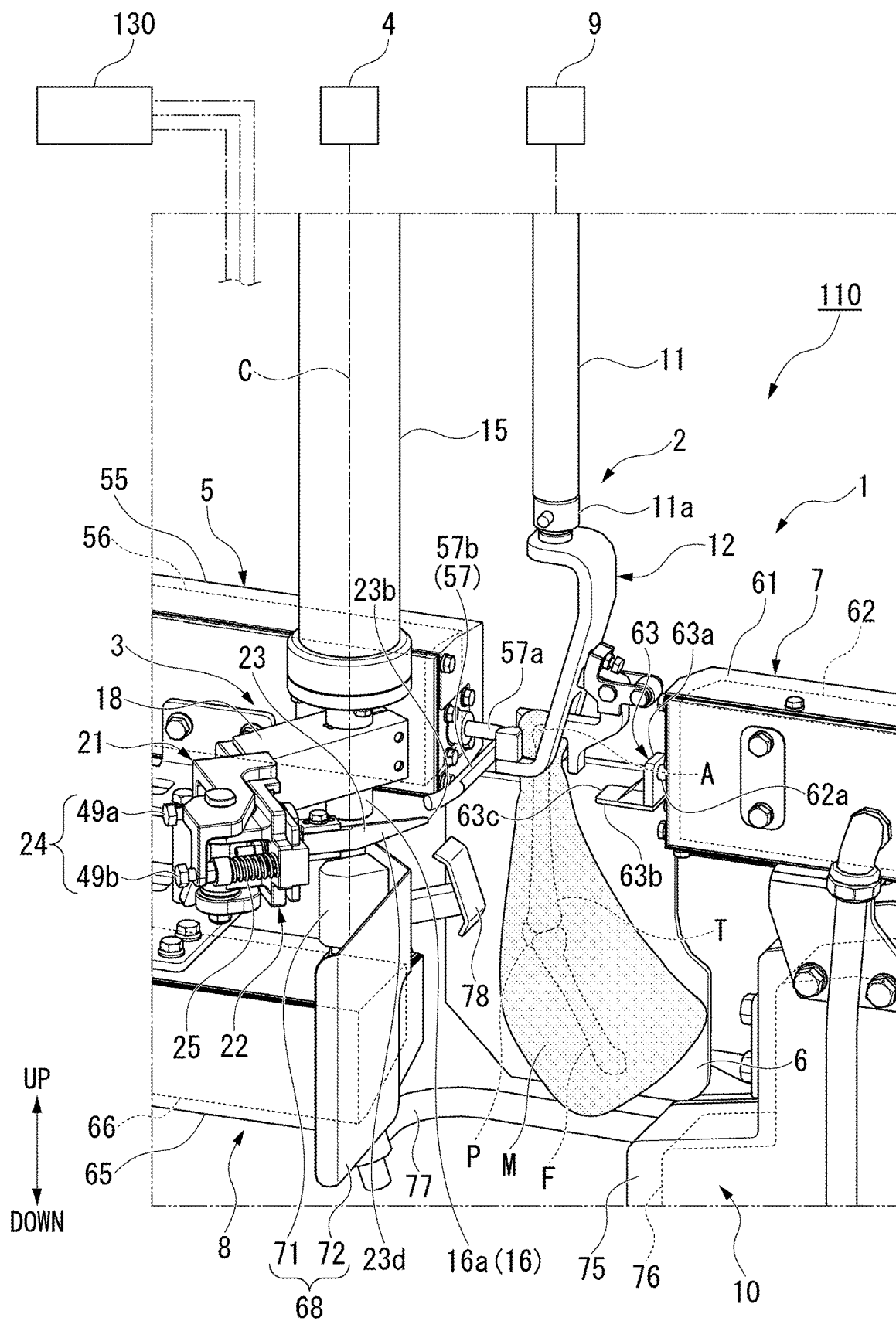
FIG. 1 is a perspective view of a slit-forming device according to an embodiment of the present invention showing a state immediately after poultry leg meat is conveyed to the slit-forming device.

FIG. 1 is an enlarged perspective view of a slit-forming device 1.

The slit-forming device 1 is installed in an automatic deboning device 110 configured to automatically remove bones (a tibia T and a femur F) from poultry leg meat M. The automatic deboning device 110 has a plurality of work stations arranged in a circumferential direction. The plurality of work stations are work spaces set for each process of processing the poultry leg meat step by step.

For example, in the automatic deboning device 110, generally, a station where poultry leg meat is input into the automatic deboning device 110, a station where slit-forming is performed on the input poultry leg meat (hereinafter referred to as a slit-forming station), a station where meat around an ankle of the poultry leg meat is cut, a station where a meat part is peeled off until a joint of the poultry leg meat, a station where articular muscle and knee cartilage are cut, a station where the meat part is finally peeled off and deboned from the bone, and a station where remaining bones are discharged are set in sequence in the circumferential direction.

Devices having respective function are provided in the stations. The poultry leg meat is processed step by step by conveying the poultry leg meat to the stations in sequence. The slit-forming device 1 is provided in a slit-forming station. Hereinafter, an upward/downward direction in a state in which the automatic deboning device 110 is placed on a floor is simply referred to as an upward/downward direction, and a horizontal direction in that state is simply referred to as a horizontal direction.

As shown in FIG. 1, the slit-forming device 1 includes an ankle holding part 2 configured to hold an ankle A of the poultry leg meat M, a blade unit 3 configured to perform slit-forming on the poultry leg meat M, a inserting driving part 4 configured to drive the blade unit 3, a leg meat pressing part 5 configured to press the poultry leg meat M, a chopping board section 6, an inner ankle pressing part 7, an inner leg meat pressing part 8, a moving part 9 configured to move the ankle holding part 2 in the upward/downward direction, and a leg meat measuring part 10.

The ankle holding part 2 includes a columnar support bar 11 extending in the upward/downward direction, and a hanger 12 provided on a lower end 11a of the support bar 11.

In the following description, a state in which the ankle holding part 2 is conveyed to the slit-forming station will be described.

The poultry leg meat is hung on the hanger 12. The moving part 9 is detachably connected to an upper end (not shown) of the support bar 11. A rotary table (not shown) is connected to an upper end (not shown) of the support bar 11. Accordingly, the ankle holding part 2 is orbited in the circumferential direction.

The moving part 9 is, for example, an electric linear actuator. The electric linear actuator is provided such that a slider (not shown) moves in the upward/downward direction. In the ankle holding part 2 conveyed to the station where the slit-forming is performed, an upper end of the support bar 11 is detachably connected to, for example, the slider (not shown) of the moving part 9. Accordingly, when the moving part 9 is driven, the ankle holding part 2 is pulled upward.

A pulling-up amount (an example of movement in the claims) of the ankle holding part 2 by the moving part 9 is detected by a sensor (not shown) provided on the moving part 9. The detection result is output to a controller 130 configured to generally control driving of the automatic deboning device 110 as a signal. In the controller 130, the pulling-up amount of the ankle holding part 2 is set. The pulling-up amount set for the ankle holding part 2 is an amount that a slit-forming blade 23, which will be described below, can pass through the poultry leg meat. The pulling-up amount is set assuming the maximum size of the poultry leg meat that can be distributed. The controller 130 controls operations of the moving part 9 on the basis of the detection result from the moving part 9.

The blade unit 3 includes a support pipe 15 extending in the upward/downward direction, a columnar driving bar 16 inserted into the support pipe 15 and protruding from above and below the support pipe 15, and a holder unit 17 attached to a lower end 16a of the driving bar 16 via an attachment block 18. The driving bar 16 is rotatably supported by the support pipe 15. The support pipe 15 is fixed to a frame (not shown) of the automatic deboning device 110.

Figure 2:
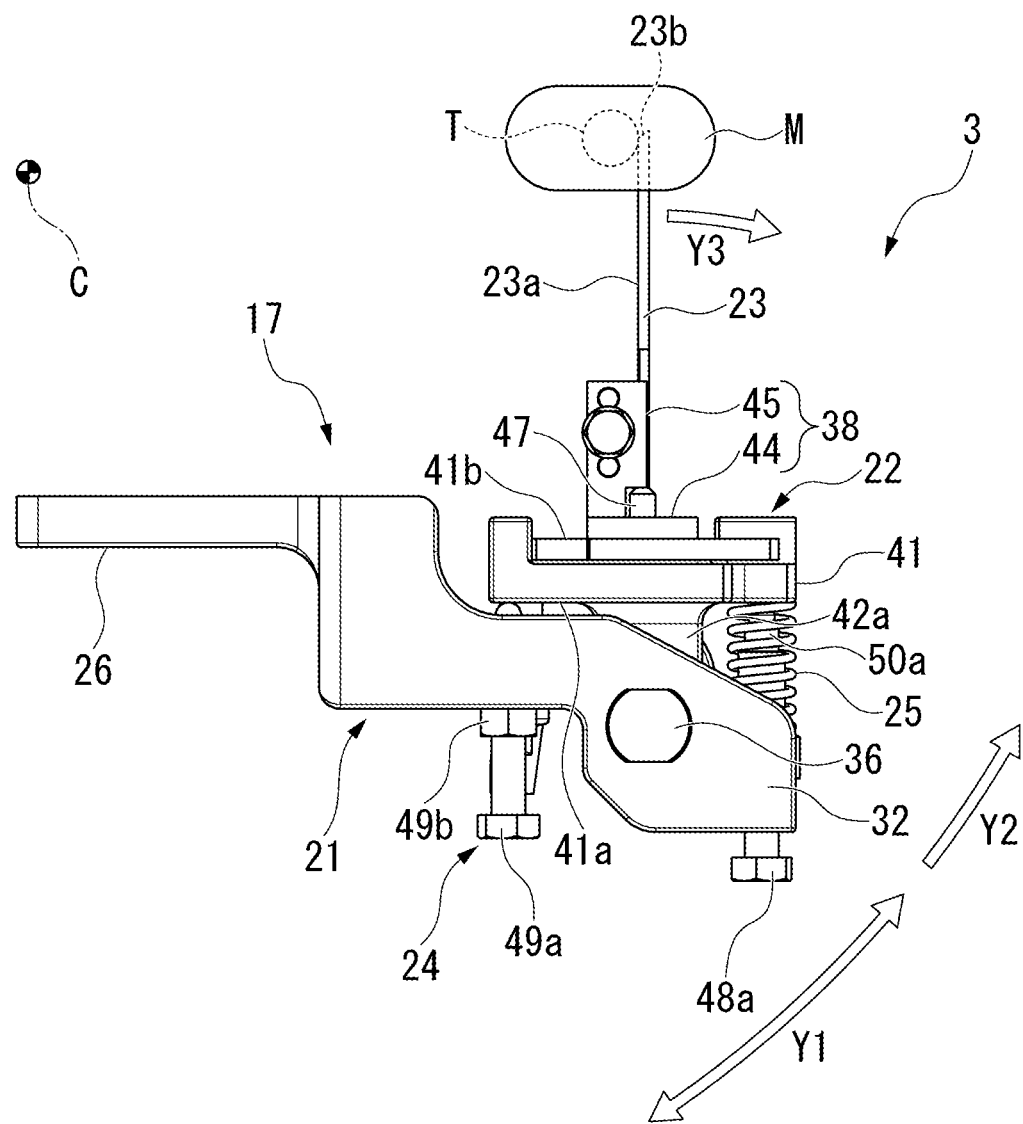
FIG. 2 is a plan view of a holder unit according to the embodiment of the present invention from above.
Figure 3:
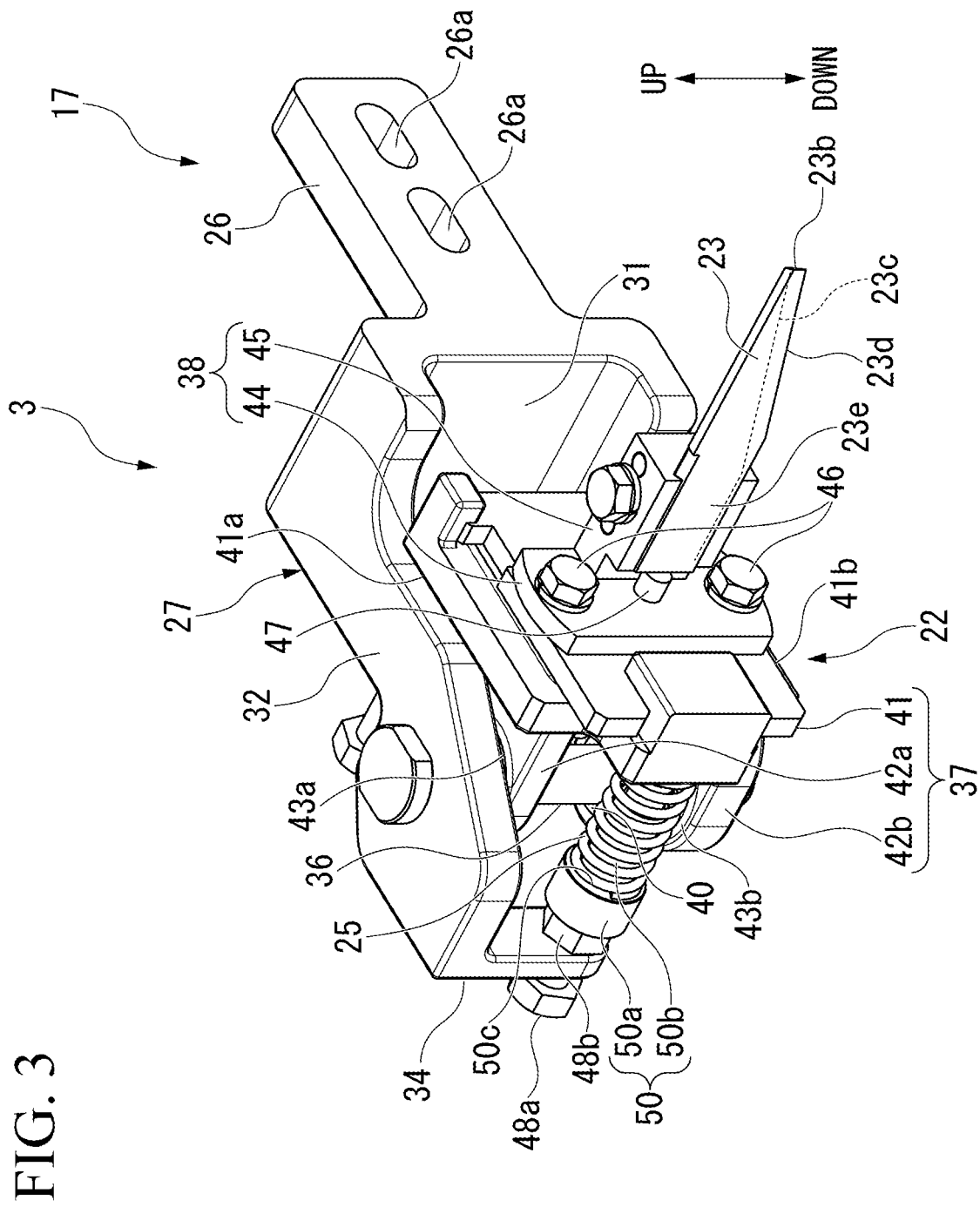
FIG. 3 is a perspective view of the holder unit according to the embodiment of the present invention from above diagonally.

FIG. 2 is a plan view showing the holder unit 17 from above. FIG. 3 is a perspective view showing the holder unit 17 from above diagonally.

As shown in FIG. 2 and FIG. 3, the holder unit 17 includes a support part 21 attached to the attachment block 18, a blade holding part 22 rotatably supported by the support part 21, the slit-forming blade 23 held on the blade holding part 22, a regulating part 24 configured to regulate a displacement range of the blade holding part 22, and a coil spring (an example of the biasing part in the claims) 25 configured to elastically bias the slit-forming blade 23 via the blade holding part 22.

The support part 21 includes a fixed part 26 having a plate shape elongated in a horizontal direction, and a support part main body 27 formed integrally with one side of the fixed part 26 in a lengthwise direction. A bolt hole 26a, through which a bolt (not shown) is inserted, configured to fasten and fix the fixed part 26 to the attachment block 18 is formed in the fixed part 26.

The support part main body 27 includes a longitudinal wall 31 formed integrally with one side of the fixed part 26 in the lengthwise direction and extending in the upward/downward direction, and a lateral wall 32 extending toward a side opposite to the fixed part 26 from both ends of the longitudinal wall 31 in the upward/downward direction. The lateral wall 32 extends while being bend so as to separate from the fixed part 26 as it separates from the longitudinal wall 31.

In the two lateral walls 32, the upper lateral wall 32 has two tongue parts 34, which are bent and extended downward on the opposite end with respect to the longitudinal wall 31, arranged in the horizontal direction. The tongue parts 34 are configured to attach the regulating part 24.

A columnar spindle 36 connected to the two lateral walls 32 is provided on the support part main body 27 in between the two tongue parts 34. The spindle 36 extends in the upward/downward direction. The blade holding part 22 is rotatably supported on the spindle 36.

The blade holding part 22 includes a holding part main body 37, and an attachment portion 38 configured to attach the slit-forming blade 23 to the holding part main body 37. The holding part main body 37 includes a plate-shaped holding base part 41 disposed closer to the fixed part 26 than the lateral wall 32, and a pair of leg parts 42a and 42b formed integrally with a back surface 41a located on the side of the lateral wall 32 of the holding base part 41. The back surface 41a of the holding base part 41 and a surface 41b opposite to the back surface 41a are provided in the upward/downward direction.

The pair of leg parts 42a and 42b protrude in the horizontal direction slightly inside from both ends of the back surface 41a in the upward/downward direction. The pair of leg parts 42a and 42b are disposed between the two lateral walls 32. The pair of leg parts 42a and 42b are disposed at a center of the holding base part 41 in the horizontal direction. Through-holes 43a and 43b passing in the upward/downward direction are formed in tip portions of the pair of leg parts 42a and 42b. Bushings 40 are attached to the through-holes 43a and 43b. The spindle 36 is inserted through the bushings 40. Accordingly, the holding part main body 37 is rotatably supported by the spindle 36 via the bushings 40. In other words, the blade holding part 22 is oscillated (swung) about the spindle 36.

The attachment portion 38 has an attachment base part 44 attached to the surface 41b of the holding base part 41 and a blade attachment part 45 protruding from the attachment base part 44 toward a side opposite to the leg parts 42a and 42b, which are formed integrally with each other. The attachment base part 44 is formed in a rectangular shape elongated in the upward/downward direction. Both ends of the attachment base part 44 in the upward/downward direction are fastened and fixed to the holding base part 41 by bolts 46.

The blade attachment part 45 is disposed at a center of the attachment base part 44 in the upward/downward direction. The slit-forming blade 23 is held on the attachment portion 38 by attaching the slit-forming blade 23 to the blade attachment part 45. The blade attachment part 45 holds the slit-forming blade 23 such that a flat portion 23a of the slit-forming blade 23 is provided in the upward/downward direction. The flat portion 23a of the slit-forming blade 23 is referred to as a flat surface portion, on which a cutting edge 23c is formed, among the flat surface portion of the slit-forming blade 23 in a front surface/back surface direction of the slit-forming blade 23.

The slit-forming blade 23 is a single cutting edge. The slit-forming blade 23 is held on the blade attachment part 45 such that a blade tip 23b protrudes toward a side opposite to the attachment base part 44. The slit-forming blade 23 is held on the blade attachment part 45 such that the cutting edge 23c is directed toward the fixed part 26. The slit-forming blade 23 is held on the blade attachment part 45 such that a blade edge 23d is directed downward.

That is, the slit-forming blade 23 swings (displaces) about the spindle 36 via the blade holding part 22 in the front surface/back surface direction of the slit-forming blade 23. The slit-forming blade 23 has the blade tip 23b protruding toward a side opposite to the attachment base part 44. The slit-forming blade 23 has a blade base 23e located closer to the spindle 36 than the blade tip 23b. For this reason, when the slit-forming blade 23 swings, the side of the blade tip 23b is displaced more greatly than the blade base 23e.

A protrusion amount of the slit-forming blade 23 from the blade attachment part 45 can be adjusted by an adjustment screw 47 protruding from a center of the attachment base part 44 in the upward/downward direction screwed from the back surface 41a of the holding base part 41.

The regulating part 24 configured to regulate a displacement range of the blade holding part 22 is constituted by a first stopper screw 48a and a first nut 48b, and a second stopper screw 49a and a second nut 49b, which are attached to the two tongue parts 34, respectively. The stopper screws 48a and 49a are screwed to female screw parts (not shown) formed in the tongue parts 34 from a side opposite to the blade holding part 22, and fixed by the nuts 48b and 49b corresponding thereto, respectively. Accordingly, after the protrusion amount of the stopper screws 48a and 49a from each of the tongue parts 34 toward the blade holding part 22 is determined once, this protrusion amount can be maintained.

In the back surface 41a of the holding base part 41, tips of the stopper screws 48a and 49a are disposed on both sides in the horizontal direction, respectively, while having the pair of leg parts 42a and 42b sandwiched therebetween. Accordingly, an oscillating amount (swing amount) of the blade holding part 22 about the spindle 36 is regulated by each of the stopper screws 48a and 49a. The oscillating amount of the blade holding part 22 is determined by the protrusion amount of each of the stopper screws 48a and 49a from each of the tongue parts 34.

The coil spring 25 is mounted from above a spring presser 50 mounted on the first stopper screw 48a. The spring presser 50 is constituted by a cylindrical section 50a loosely fitted to the first stopper screw 48a and a flange section 50b integrally formed with an end of the cylindrical section 50a on the side of the tongue parts 34. The flange section 50b is formed to be wider than the cylindrical section 50a via a step difference. The coil spring 25 is mounted such that an end surface of the coil spring 25 abuts an end surface 50c located at the side of the holding base part 41 in the flange section 50b.

The coil spring 25 is mounted while being slightly compressed between the flange section 50b and the holding base part 41. Accordingly, an elastic force of the coil spring 25 is applied, and the side of the first stopper screw 48a of the holding base part 41 is biased forward. That is, the coil spring 25 elastically biases the slit-forming blade 23 via the blade holding part 22 such that the cutting edge 23c is directed toward the fixed part 26.

With this configuration, the inserting driving part 4 rotates the driving bar 16 around a shaft center C of the driving bar 16 within a predetermined range. The inserting driving part 4 is constituted by, for example, an actuator and a link mechanism.

As the driving bar 16 is pivoted, the holder unit 17 is swung around the shaft center C within a predetermined range (see an arrow Y1 of FIG. 2). Specifically, the holder unit 17 is swung around the shaft center C such that the blade tip 23*b* of the slit-forming blade 23 advances to be located just below the hanger 12 and retreats from just below the hanger 12. The holder unit 17 has the fixed part 26 fixed to the attachment block 18 attached to the driving bar 16. For this reason, the slit-forming blade 23 is elastically biased toward the shaft center C by the coil spring 25.

In the following description, the fully advanced position of the holder unit 17 (the slit-forming blade 23) is referred to as an advanced position, and the fully retracted position of the holder unit 17 (the slit-forming blade 23) is referred to as a retreated position. At the advanced position of the holder unit 17, the blade tip 23*b* of the slit-forming blade 23 is inserted into the poultry leg meat hung by the ankle holding part 2 (details will be described below).

As shown in FIG. 1, the leg meat pressing part 5 includes a waterproof case 55 fixed to a frame (not shown) of the automatic deboning device 110, a pressing actuator (an example of a pressing force adjusting part in the claims) 56 accommodated in the waterproof case 55, and a pressing bar 57 connected to a rod (not shown) of the pressing actuator 56. The leg meat pressing part 5 presses the poultry leg meat hung on the hanger 12 from an outer side of the hanger 12 in the radial direction.

The pressing bar 57 protrudes outward via the waterproof case 55. The pressing bar 57 is constituted by a rod section 57*a* that advances and retreats with respect to the waterproof case 55, and a pressing bar main body 57*b* bent and extending at a right angle with respect to the rod section 57*a* from the tip of the rod section 57*a*. The pressing bar main body 57*b* presses the poultry leg meat from the outer side of the hanger 12 in the radial direction.

In the leg meat pressing part 5, the pressing bar main body 57*b* is located substantially just below the hanger 12 in a state in which the pressing bar 57 is fully moved forward by the pressing actuator 56. The leg meat pressing part 5 is provided such that the pressing bar main body 57*b* does not come into contact with the waterproof case 55 in a state in which the pressing bar 57 is fully retracted by the pressing actuator 56. In the following description, in the leg meat pressing part 5, the fully advanced position of the pressing bar 57 is referred to as a pressing position, and the fully retracted position of the pressing bar 57 is referred to as a retreated position.

The pressing actuator 56 advances the pressing bar 57 while applying a predetermined elastic pressing force to the pressing bar 57 until the pressing bar 57 is moved to the pressing position from the retreated position. The elastic pressing force of the pressing actuator 56 is not constant, but is changed (for example, reduced) according to the pulling-up amount of the ankle holding part 2 by the moving part 9. That is, the pressing actuator 56 also functions as a pressing force adjusting part that changes the pressing force of the pressing bar 57 according to the pulling-up amount of the ankle holding part 2 by the moving part 9. Information of the pulling-up amount of the ankle holding part 2 is acquired from the controller 130.

The chopping board section 6 is attached to a frame (not shown) of the automatic deboning device 110. The chopping board section 6 is disposed on a side opposite side to the blade unit 3 with the hanger 12 sandwiched therebetween and below the hanger 12. The chopping board section 6 is shaped like a plate so that it is positioned mostly below the hanger 12. The chopping board section 6 is arranged to face the upward/downward direction and the radial direction.

The inner ankle pressing part 7 includes a waterproof case 61 fixed to the frame (not shown) of the automatic deboning device 110, an inner pressing actuator 62 accommodated in the waterproof case 61, and an inner pressing 63 attached to a tip of a rod 62*a* in the inner pressing actuator 62. The inner ankle pressing part 7 presses the vicinity of the ankle of the poultry leg meat hung on the hanger 12 from an inner side of the hanger 12 in the radial direction.

The rod 62*a* of the inner pressing actuator 62 protrudes to an outer side of the waterproof case 61 via a rod insertion hole (not shown) formed in the waterproof case 61. The inner pressing 63 attached to the protruded tip is formed in an L shape when seen in the radial direction. That is, the inner pressing 63 is constituted by a base section 63*a* attached to the rod 62*a* and a lower plate 63*b* formed integrally with a lower end of the base section 63*a*.

The lower plate 63*b* extends in the horizontal direction from the base section 63*a* toward an outer side in the radial direction. A tip side 63*c* of the lower plate 63*b* is formed parallel to the pressing bar main body 57*b* of the leg meat pressing part 5. The lower plate 63*b* presses the vicinity of the ankle of the poultry leg meat from an inner side in the radial direction.

The inner ankle pressing part 7 is disposed such that the tip of the lower plate 63*b* is positioned directly below the hanger 12 and slightly inside the hanger 12 in the radial direction in a state in which the inner pressing 63 is fully advanced by the inner pressing actuator 62. The inner ankle pressing part 7 is provided such that the inner pressing 63 does not come into contact with the waterproof case 61 in a state in which the inner pressing 63 is fully retracted by the inner pressing actuator 62. In the following description, in the inner ankle pressing part 7, the fully advanced position of the inner pressing 63 is referred to as a pressing position, and the fully retracted position of the inner pressing 63 is referred to as a retreated position.

The leg meat-inside pressing part 8 includes a waterproof case 65 fixed to the frame (not shown) of the automatic deboning device 110, a leg meat-inside pressing actuator 66 accommodated in the waterproof case 65, and a thigh presser 68 connected to the leg meat-inside pressing actuator 66. The leg meat-inside pressing part 8 presses the poultry leg meat hung on the hanger 12 from a side opposite to the chopping board section 6.

The thigh presser 68 includes an attachment block 71 attached to the leg meat-inside pressing actuator 66 and a pressing plate 72 fixed to the attachment block 71. The leg meat-inside pressing part 8 is swung by the leg meat-inside pressing actuator 66 so that the pressing plate 72 approaches and separates from the chopping board section 6. The swing range of the pressing plate 72 is a range between a position where the pressing plate 72 is substantially parallel to the chopping board section 6 and the pressing plate 72 facing the chopping board section 6 and a position where the pressing plate 72 is separated from the chopping board section 6 such that the pressing plate 72 does not come into contact with the waterproof case 65.

In the following description, in the leg meat-inside pressing part 8, a position where the pressing plate 72 advances to face the chopping board section 6 and the pressing plate 72 is substantially parallel to the chopping board section 6 is referred to as a pressing position. A position where the pressing plate 72 retreats to approach the waterproof case 65 is referred to as a retreated position.

The leg meat measuring part 10 includes a waterproof case 75 fixed to the frame (not shown) of the automatic deboning device 110, a leg meat measurement actuator 76 accommodated in the waterproof case 75, an encoder (not shown) provided in the leg meat measurement actuator 76, and a measurement arm 77 connected to the leg meat measurement actuator 76. The leg meat measuring part 10 measures an external form of the poultry leg meat when the ankle holding part 2 is pulled up by the moving part 9 (details will be described below).

The measurement arm 77 extends outward in the radial direction along the horizontal direction from the waterproof case 75 and is bent upward to fold back. An abutting plate 78 abutting the poultry leg meat is provided on a tip of the measurement arm 77. The measurement arm 77 is pivoted by the leg meat measurement actuator 76 such that the abutting plate 78 moves about the base end of the measurement arm 77 in the upward/downward direction. The pivoting position is detected by the encoder (not shown). In the following description, in the leg meat measuring part 10, a position where the abutting plate 78 is raised is referred to as a measurement position, and a position where the abutting plate 78 is lowered is referred to as a retreated position.

Next, operations of the slit-forming device 1 will be described on the basis of FIG. 1, FIG. 2, FIG. 4A, FIG. 4B, and FIG. 4C.

As shown in FIG. 1, first, the poultry leg meat M conveyed to the slit-forming device 1 is hung such that the ankle A is caught on the hanger 12 provided on the ankle holding part 2 in the station into which the poultry leg meat M is input. Accordingly, the ankle A of the poultry leg meat M is held by the hanger 12 (the ankle holding part 2) (ankle holding process).

Here, a posture of the poultry leg meat M is in a state in which the tibia T is located above and the femur F is located below. A body height direction of the poultry leg meat M in which the tibia T or the femur F extends is an extending direction of the poultry leg meat M. The extending direction of the poultry leg meat M hung on the hanger 12 substantially coincides with the upward/downward direction.

At the time the ankle holding part 2 is conveyed to the slit-forming station from the station into which the poultry leg meat M is input, in the posture of the poultry leg meat M, a kneecap P faces an outer side in the radial direction. At this time, the holder unit 17 (the blade unit 3), the leg meat pressing part 5, the inner ankle pressing part 7, the leg meat-inside pressing part 8, and the leg meat measuring part 10 are each at the retreated position.

After the process, the leg meat pressing part 5, the inner ankle pressing part 7 and the leg meat-inside pressing part 8 are moved to the pressing position. Then, the poultry leg meat M just below the hanger 12, i.e., just below the ankle A, is clamped by the pressing bar main body 57b of the pressing bar 57 of the leg meat pressing part 5 and the lower plate 63b of the inner pressing 63 of the inner ankle pressing part 7 in the radial direction (among these, ankle pressing by the pressing bar 57 of the leg meat pressing part 5 is a pressing process). Accordingly, a posture of the poultry leg meat M in the vicinity of the ankle A is determined.

Most of the lower portion of the poultry leg meat M other than the vicinity of the ankle A is clamped by the chopping board section 6 and the pressing plate 72 of the leg meat-inside pressing part 8 in the circumferential direction. Accordingly, the posture of the poultry leg meat M is maintained at a constant posture.

The leg meat measuring part 10 moves to the measurement position. Then, the abutting plate 78 of the leg meat measuring part 10 is abutted slightly above the kneecap P of the poultry leg meat M.

After this state, the holder unit 17 (the blade unit 3) is moved to the advanced position.

Figure 4A:
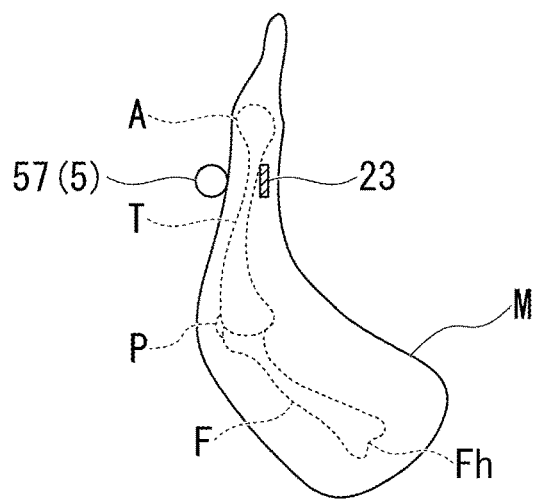
FIG. 4A is a slit-forming process view according to the embodiment of the present invention.
Figure 4B:
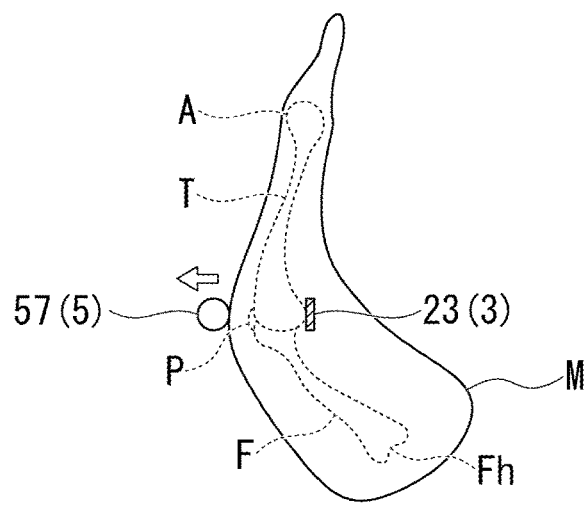
FIG. 4B is a slit-forming process view according to the embodiment of the present invention.
Figure 4C:
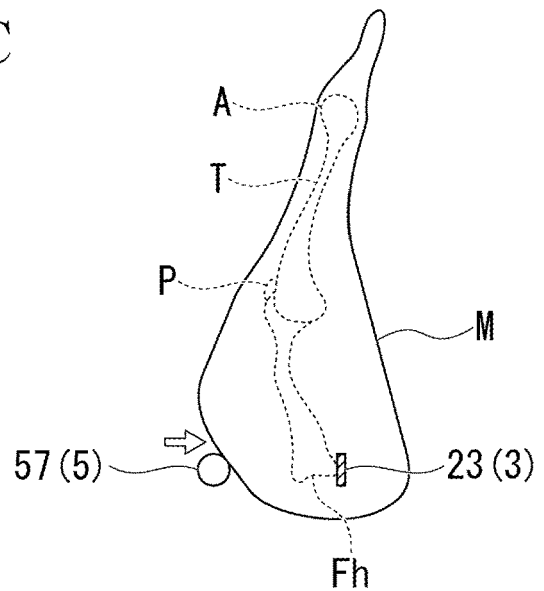
FIG. 4C is a slit-forming process view according to the embodiment of the present invention.

FIG. 4A, FIG. 4B and FIG. 4C are slit-forming process views.

As shown in FIG. 1, FIG. 2 and FIG. 4A, at the advanced position of the holder unit 17 (the blade unit 3), the slit-forming blade 23 advances (see an arrow Y2 in FIG. 2). In the poultry leg meat M, the blade tip 23b of the slit-forming blade 23 is inserted directly under the hanger 12 so as not to pass through the poultry leg meat M (blade inserting process).

More specifically, the blade tip 23b of the slit-forming blade 23 is inserted directly below the hanger 12 at the opposite side with respect to the kneecap P of the tibia T, that is, along an inner side of the tibia T in the radial direction. Further, in other words, the blade tip 23b of the slit-forming blade 23 is inserted at an opposite side of the axis C, which is the swing axis of the holder unit 17 (the blade unit 3), with respect to the tibia T.

The cutting edge 23c of the slit-forming blade 23 is directed toward the fixed part 26. For this reason, in the posture of the slit-forming blade 23 in a state in which the slit-forming blade 23 is inserted into the poultry leg meat M, the flat portion 23a and the cutting edge 23c are directed toward the side of the tibia T. The blade edge 23d of the slit-forming blade 23 is directed downward.

Incidentally, the inserting position of the slit-forming blade 23 is desirably aligned so that the blade tip 23b is located as close to the tibia T as possible. However, the poultry leg meat M has different thicknesses of bones depending on differences in chicken species, day-old, farm rearing methods, and the like. For this reason, a position of a side surface of the tibia T, i.e., a inserting position of the blade tip 23b of the slit-forming blade 23 is slightly different for each poultry leg meat M even when a posture of the poultry leg meat M in the vicinity of the ankle A is determined by the leg meat pressing part 5 and the inner ankle pressing part 7. As a result, when the inserting position of the slit-forming blade 23 is adjusted toward a side portion of the tibia T as much as possible such that the blade tip 23b comes into contact with the tibia T, there was a possibility that the slit-forming blade 23 may stick into the tibia T.

The slit-forming blade 23 swings (displaces) about the spindle 36 in the front surface/back surface direction of the slit-forming blade 23 via the blade holding part 22. Moreover, the slit-forming blade 23 is elastically biased toward the shaft center C by the coil spring 25. That is, the flat portion 23a of the slit-forming blade 23 is elastically biased toward the tibia T by the coil spring 25.

For this reason, when the slit-forming blade 23 sticks into the tibia T, the blade tip 23b of the slit-forming blade 23 escapes along the tibia T in the front surface/back surface direction against the spring force of the coil spring 25 (see an arrow Y3 in FIG. 2). The blade holding part 22 holds the slit-forming blade 23 so that the slit-forming blade 23 swings around the spindle 36 which is behind the blade base 23e. Accordingly, the slit-forming blade 23 is displaced in the front surface/back surface direction more on the side of the blade tip 23b than on the blade base 23e. For this reason, when the slit-forming blade 23 hits into the tibia T, the blade tip 23b can easily escape from the tibia T.

Moreover, the cutting edge 23c of the slit-forming blade 23 is directed toward the tibia T. For this reason, when the slit-forming blade 23 sticks into the tibia T, a force is easily applied in the direction of escaping from the tibia T. As a result, the slit-forming blade 23 is easy to escape along the tibia T. Accordingly, the slit-forming blade 23 does not stick into the tibia T. Moreover, the slit-forming blade 23 is elastically biased toward the tibia T. For this reason, the slit-forming blade 23 is displaced along the tibia T as much as possible.

When the slit-forming blade 23 is inserted into the poultry leg meat M, the chopping board section 6 is disposed at a side opposite to the slit-forming blade 23 with the poultry leg meat M sandwiched therebetween. For this reason, when the slit-forming blade 23 is inserted into the poultry leg meat M by the chopping board section 6, the poultry leg meat M is prevented from escaping in the inserting direction of the slit-forming blade 23 (escape holding process).

Accordingly, the slit-forming blade 23 is reliably inserted into the poultry leg meat M. The poultry leg meat M is clamped by the chopping board section 6 and the pressing plate 72 of the leg meat-inside pressing part 8. For this reason, the poultry leg meat M does not flutter on an impact when the slit-forming blade 23 is inserted into the poultry leg meat M.

Next, after returning the inner ankle pressing part 7 to the retreated position, the ankle holding part 2 is pulled up by the moving part 9. Here, the pressing process is continued. The ankle holding part 2 is pulled up. Due to the relative movement between the poultry leg meat M and the holder unit 17 (the blade unit 3), the slit-forming blade 23 is vertically lowered against the poultry leg meat M (slit-forming process). That is, this vertical lowering is performed in the slit-forming moving direction of the slit-forming blade 23.

The pressing process continues until the ankle holding part 2 is pulled up to the predetermined amount (until the slit-forming process is ended). When pulling up the ankle holding part 2, the pressing bar 57 of the leg meat pressing part 5 pulls up the poultry leg meat M while elastically pressing the surface of the poultry leg meat M from the outer side in the radial direction (the side of the kneecap P). That is, the pressing bar 57 of the leg meat pressing part 5 pulls up the poultry leg meat M while always elastically pressing the tibia T toward the slit-forming blade 23. For this reason, the poultry leg meat M is pulled up while the slit-forming blade 23 is firmly aligned with the tibia T.

The posture of the poultry leg meat M is a state in which the femur F, which is positioned downward from the kneecap P, is positioned more radially inward than the tibia T. For this reason, when the slit-forming blade 23 passes the back side (an inner side in the radial direction) of the kneecap P of the poultry leg meat M (see FIG. 4B), the femur F is bent slightly along the upward/downward direction at the joint portion of the kneecap P. Due to the reaction force of the femur F pressed against the slit-forming blade 23, the poultry leg meat M is displaced on an outer side in the radial direction.

The pressing actuator 56 of the leg meat pressing part 5 can also function as a pressing force adjusting part that changes (reduces) the pressing force of the pressing bar 57 according to the pulling-up amount of the ankle holding part 2 by the moving part 9. More specifically, as a pressing force adjusting part, when the pressing bar 57 passes the kneecap P of the poultry leg meat M, the pressing force of the pressing bar 57 on the poultry leg meat M is set to be reduced most. For this reason, when the slit-forming blade 23 passes the back side of the kneecap P, the displacement of the poultry leg meat M to the outer side in the radial direction is properly allowed (see an arrow in FIG. 4B).

Moreover, depending on the load applied to the slit-forming blade 23, the slit-forming blade 23 will escape properly from the back side of the kneecap P or the femur F. For this reason, from the back side of the kneecap P until a femur head Fh of the femur F, the slit-forming blade 23 does not cut into the cartilage part of the joint. The slit-forming blade 23 is certainly moves along each of the bones T and F (see FIG. 4C). That is, the pressing force of the pressing bar 57 is changed (reduced). Accordingly, a posture (position) of the bone of the poultry leg meat M is changed such that the slit-forming blade 23 is moved along the bone of the poultry leg meat M.

The ankle holding part 2 is raised by the moving part 9 to the predetermined amount, and when the slit-forming blade 23 has passed the poultry leg meat M, the slit-forming on the poultry leg meat M is terminated (see FIG. 4C).

When the moving part 9 raises the ankle holding part 2, the abutting plate 78 of the leg meat measuring part 10 displaces while following the shape on the outer side of the poultry leg meat M in the radial direction. The measurement arm 77 is pivoted according to displacement of the abutting plate 78. By detecting the pivoting position of the measurement arm 77 with an encoder (not shown), the external form of the part of the poultry leg meat M that was in contact with the abutting plate 78 is measured. This measurement result is used in the station where the meat part is peeled off and deboned from the bone. After completing these operations, the leg meat pressing part 5 and the blade unit 3 return to the retreated position.

As described above, the slit-forming device 1 includes the ankle holding part 2, the blade unit 3, the inserting driving part 4, the leg meat pressing part 5, and the moving part 9. The blade unit 3 includes the blade holding part 22 and the coil spring 25. For this reason, when the blade tip 23b of the slit-forming blade 23 is inserted along the side portion of the tibia T by the inserting driving part 4, if the slit-forming blade 23 hits into the tibia T, the slit-forming blade 23 can escape in the front surface/back surface direction. Accordingly, it is possible to prevent the slit-forming blade from sticking into the bone.

The coil spring 25 elastically biases the slit-forming blade 23 along the tibia T. For this reason, it is possible to reliably align the slit-forming blade 23 with the tibia T. When the slit-forming blade 23 hits into the tibia T, the slit-forming blade 23 escapes from the tibia T. For this reason, the slit-forming blade 23 can be inserted toward the closest side portion of the tibia T as much as possible. The bones T and F and the slit-forming blade 23 do not displace away from each other according to the leg meat pressing part 5. The slit-forming blade 23 can be moved to perform slit-forming while bringing the slit-forming blade 23 in close contact with each of the bones T and F. Accordingly, in the final process of peeling the meat part off each of the bones T and F later, remaining bone pieces in the deboned poultry leg meat M can be suppressed. The yield percentage of the deboned poultry leg meat M can be improved.

The slit-forming device 1 hangs the poultry leg meat M using the ankle holding part 2. By pulling up the ankle holding part 2 with the moving part 9, the slit-forming blade 23 is moved downward with respect to the poultry leg meat M to perform the slit-forming. For this reason, the posture of the poultry leg meat M can be easily controlled using gravity. It is possible to make the slit-forming blade 23 to easily cut along with each of the bones T and F.

The slit-forming blade 23 is a single cutting edge. The blade holding part 22 holds the slit-forming blade 23 so that the cutting edge 23c faces the tibia T of the poultry leg meat M. The cutting edge 23c makes it easier to apply a force in the escaping direction away from the bone to the slit-forming blade 23 when it hits the tibia T. For this reason, the slit-forming blade 23 can be more reliably inserted while aiming the closest side portion of each of the bones T and F as much as possible. Accordingly, the yield percentage of the deboned poultry leg meat M can be reliably improved.

The pressing actuator 56 also functions as a pressing force adjusting part that changes (reduces) the pressing force of the pressing bar 57 according to the pulling-up amount of the ankle holding part 2 by the moving part 9. For this reason, even if the poultry leg meat M is pulled up in a straight line, the cartilage part of the joint is not cut with the slit-forming blade 23 while passing the back side of the kneecap P until the femur head Fh of the femur F. In other words, even if the slit-forming blade 23 is moved down in a straight line in the extending direction of the poultry leg meat M, the cartilage part of the joint is not cut by the slit-forming blade 23 while passing the back side of the kneecap P until the femur head Fh of the femur F. That is, by changing (reducing) the pressing force of the pressing bar 57, the posture (position) of the bone of the poultry leg meat M can be changed so that the slit-forming blade 23 is aligned with the bone of the poultry leg meat M. The slit-forming blade 23 does not damage each of the bones T and F. The slit-forming blade 23 can be reliably aligned with each of the bones T and F. Accordingly, remaining of bone pieces in the deboned poultry leg meat M can be more reliably suppressed. The yield percentage of the deboned poultry leg meat M can be more reliably improved.

The blade holding part 22 holds the slit-forming blade 23 so that the slit-forming blade 23 swings around the spindle 36 which is behind the blade base 23e. Accordingly, the slit-forming blade 23 is displaced in the front surface/back surface direction of the slit-forming blade 23 more on the side of the blade tip 23b than on the blade base 23e. For this reason, when the blade tip 23b of the slit-forming blade 23 hits each of the bones T and F, the slit-forming blade 23 are made easier to escape from each of the bones T and F.

The blade holding part 22 has its swing range (the displacement range of the slit-forming blade 23) regulated by the regulating part 24. When the swing range of the blade holding part 22 is unnecessarily widened, it is difficult to determine the position of the blade tip 23b of the slit-forming blade 23. It becomes difficult to insert the slit-forming blade 23 while aiming a part closest to the side portion of the tibia T. For this reason, by regulating the swing range of the blade holding part 22 with the regulating part 24, it becomes easier for the blade tip 23b of the slit-forming blade 23 to insert the meat while aiming a part which is closest to the side portion of the tibia T. Accordingly, the yield percentage of the deboned poultry leg meat M can be further improved.

The regulating part 24 is constituted by the first stopper screw 48a and the first nut 48b, and the second stopper screw 49a and the second nut 49b. For this reason, the swing range of the blade holding part 22 can be easily adjusted.

The inserting driving part 4 drives the blade unit 3 around the shaft center C. For this reason, the blade unit 3 can be easily evacuated while minimizing the movement amount of the blade unit 3. Accordingly, a conveyance space for the poultry leg meat M can be easily secured, and the slit-forming device 1 can be miniaturized.

The slit-forming device 1 includes the chopping board section 6. For this reason, the chopping board section 6 prevents the poultry leg meat M from escaping in the inserting direction of the slit-forming blade 23 when inserting the slit-forming blade 23 into the poultry leg meat M. Accordingly, the slit-forming blade 23 can be reliably inserted into the poultry leg meat M.

The method of performing slit-forming on the poultry leg meat M has an ankle holding process, a blade inserting process, a pressing process, and a slit-forming process. In the blade inserting process and the slit-forming process, the slit-forming blade 23 is elastically biased such that the flat portion 23a of the slit-forming blade 23 faces each of the bones T and F. For this reason, in the final process of peeling the meat part off each of the bones T and F later, remaining bone pieces in the deboned poultry leg meat M can be suppressed, and the yield percentage of the deboned poultry leg meat M can be improved.

The present invention is not limited to the above-described embodiments, but various modifications of the above-described embodiments may be made without departing from the scope of the present invention.

For example, in the above-mentioned embodiment, the case of hanging the poultry leg meat M by the ankle holding part 2 has been described. However, there is no limitation thereto, and the ankle holding part 2 may hold the ankle A of the poultry leg meat M. The chopping board section 6 may be disposed in the horizontal direction, and the poultry leg meat M may be placed on the chopping board section 6. It may be configured so that the ankle A of the poultry leg meat M placed thereon is held. In this case, the blade unit 3, the inserting driving part 4, the leg meat pressing part 5, the inner ankle pressing part 7, the leg meat-inside pressing part 8, the moving part 9, and the leg meat measuring part 10 may be provided according to the posture of the poultry leg meat M. The moving part 9 may be configured to move the ankle holding part 2 in the horizontal direction.

In the above embodiment, the case in which the slit-forming blade 23 performs slit-forming on the poultry leg meat M by moving the ankle holding part 2 with the moving part 9 has been described. However, there is no limitation thereto, and the moving part 9 should be configured so that at least one of the ankle holding part 2 and the blade unit 3 moves in the extending direction of the poultry leg meat M with respect to the other. The slit-forming blade 23 may be moved with respect to the poultry leg meat M by the moving part 9 to perform slit-forming.

In the above-mentioned embodiment, the case in which the blade holding part 22 holds the slit-forming blade 23 such that the slit-forming blade 23 is swung around the spindle 36 which is behind the blade base 23e has been described. Accordingly, the case in which the slit-forming blade 23 is displaced in the front surface/back surface direction has been described. The case in which the slit-forming blade 23 escapes from each of the bones T and F when the blade tip 23b of the slit-forming blade 23 hits each of the bones T and F has been described. However, there is no limitation thereto, and the blade holding part 22 may have a configuration in which the slit-forming blade 23 is held to be displaceable in the front surface/back surface direction of the slit-forming blade 23. For example, the entire slit-forming blade 23 may be configured to be displaced in parallel direction.

In the above-mentioned embodiment, the case in which the holder unit 17 moves between the advanced position and the retreated position as the blade unit 3 is pivoted around the shaft center C by the inserting driving part 4 has been described. However, there is no limitation thereto, and the inserting driving part 4 may be configured to move the holder unit 17 linearly and insert the blade tip 23b of the slit-forming blade 23 into the poultry leg meat M.

In the above-mentioned embodiment, the case in which the coil spring 25 is used as the biasing part configured to elastically bias the flat portion 23a of the slit-forming blade 23 toward the tibia T has been described. However, there is no limitation thereto, and a member that elastically biases the slit-forming blade 23 may be used as the biasing part. For example, rubber, sponge, or the like, may be used instead of the coil spring 25.

In the above-mentioned embodiment, the case in which the regulating part 24 configured to regulate the displacement range of the blade holding part 22 is constituted by the first stopper screw 48a and the first nut 48b, and the second stopper screw 49a and the second nut 49b has been described. However, there is no limitation thereto, and the regulating part 24 may be configured to regulate the displacement range of the blade holding part 22. For example, a convex portion may be formed instead of each of the stopper screws 48a and 49a.

In the above-mentioned embodiment, the case in which the slit-forming blade 23 is a so-called single cutting edge has been described. However, there is no limitation thereto, and the slit-forming blade 23 may be provided with both cutting edges. In this case, the flat portion 23a of the slit-forming blade 23 may refer to both flat surface portions of the slit-forming blade 23 in the front surface/back surface direction of the slit-forming blade 23.

INDUSTRIAL APPLICABILITY

According to the poultry leg meat slit-forming device, in the final process of peeling the meat part off the bone, remaining bone pieces in the deboned poultry leg meat can be suppressed. The yield percentage of the deboned poultry leg meat can be improved.

REFERENCE SIGNS LIST

1 Slit-forming device (poultry leg meat slit-forming device)
2 Ankle holding part
3 Blade unit
4 Inserting driving part
5 Leg meat pressing part
6 Chopping board section
8 Leg meat-inside pressing part
9 Moving part
12 Hanger (ankle holding part)
22 Blade holding part
23 Slit-forming blade
23a Flat portion
23b Blade tip
23c Cutting edge
23d Blade Edge
23e Blade base
24 Regulating part
25 Coil spring (biasing part)
48a First stopper screw (regulating part)
49a Second stopper screw (regulating part)
56 Pressing actuator (pressing force adjusting part)
A Ankle
C Shaft center (axis)
Fh Femur head
M Poultry leg meat
P Kneecap
T Tibia

The invention claimed is:

1. A poultry leg meat slit-forming device comprising:
an ankle holding part configured to hold an ankle of bone-in poultry leg meat cut from a femur of a poultry carcass;
a blade unit having a slit-forming blade;
an inserting driving part configured to drive the blade unit such that an blade tip of the slit-forming blade is inserted into the poultry leg meat along an opposite side with respect to a kneecap in a tibia among the poultry leg meat held on the ankle holding part;
a leg meat pressing part configured to elastically press a surface of the poultry leg meat from a side of the kneecap; and
a moving part configured to move at least one of the ankle holding part and the blade unit with respect to the other one such that the slit-forming blade makes a slit-forming movement in an extending direction of the poultry leg meat held by the ankle holding part, wherein
the blade unit comprises:
a blade holding part that is configured to hold the slit-forming blade such that a blade edge of the slit-forming blade faces a side opposite with respect to the ankle holding part in a direction of the slit-forming movement of the slit-forming blade and that is configured to hold the slit-forming blade so as to be displaceable in a front surface/back surface direction of the slit-forming blade; and
a biasing part configured to elastically bias the slit-forming blade toward a bone of the poultry leg meat in the front surface/back surface direction of the slit-forming blade.

2. The poultry leg meat slit-forming device according to claim 1, wherein
the ankle holding part hangs the poultry leg meat, and
the moving part vertically moves at least one of the ankle holding part and the blade unit such that the slit-forming blade makes the slit-forming movement downward with respect to the poultry leg meat.

3. The poultry leg meat slit-forming device according to claim 1, wherein the leg meat pressing part has a pressing force adjusting part configured to change a posture of the bone of the poultry leg meat such that the slit-forming blade move along with the bone of the poultry leg meat by changing a pressing force against the poultry leg meat according to a relative movement amount between the ankle holding part and the blade unit by the moving part.

4. The poultry leg meat slit-forming device according to claim 1, wherein the blade holding part holds the slit-forming blade such that the slit-forming blade is swung about a rear of an blade base of the slit-forming blade and a blade tip side of the slit-forming blade is displaced in the front surface/back surface direction more greatly than the blade base side of the slit-forming blade.

5. The poultry leg meat slit-forming device according to claim 1, wherein the blade holding part comprises a regulating part configured to regulate a displacement range of the slit-forming blade.

6. The poultry leg meat slit-forming device according to claim 1, further comprising a chopping board section configured to hold escape of the slit-forming blade in an inserting direction in the poultry leg meat.

7. A poultry leg meat automatic slit-forming method comprising:
an ankle holding process of holding an ankle of bone-in poultry leg meat cut from a femur of a poultry carcass;
a blade inserting process of inserting a blade tip of a slit-forming blade into the poultry leg meat along an opposite side with respect to a kneecap in a tibia among the poultry leg meat and so that the blade tip of the slit-forming blade does not pass through the poultry leg meat at a vicinity of the ankle of the poultry leg meat;

a pressing process of elastically pressing a surface of the poultry leg meat from a side of the kneecap after the blade inserting process; and a slit-forming process of performing a slit-forming along a bone of the poultry leg meat by making the slit-forming blade to perform a slit-forming movement in a straight line until a femur head of the poultry leg meat in a state in which the pressing process is continued, wherein in the blade inserting process and the slit-forming process, the slit-forming blade is elastically biased such that a flat portion of the slit-forming blade faces toward the bone.

8. The poultry leg meat automatic slit-forming method according to claim 7, wherein, in the pressing process, when a movement amount of the slit-forming blade exceeds a predetermined amount during the slit-forming process, a pressing force against the poultry leg meat is reduced.

9. The poultry leg meat automatic slit-forming method according to claim 7, wherein in the ankle holding process, the poultry leg meat is hung, and in the slit-forming process, the slit-forming blade is vertically lowered.

10. The poultry leg meat automatic slit-forming method according to claim 7, wherein, in the blade inserting process, the pressing process, and the slit-forming process, an escape holding process of holding escape of the slit-forming blade in an inserting direction in the poultry leg meat is provided.

* * * * *